United States Patent
Chiang

(10) Patent No.: US 11,705,630 B1
(45) Date of Patent: Jul. 18, 2023

(54) ANTENNA WITH MOVABLE FEED

(71) Applicant: Maxar Space LLC, Palo Alto, CA (US)

(72) Inventor: Jason Chiang, Fremont, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/714,067

(22) Filed: Apr. 5, 2022

(51) Int. Cl.
| | |
|---|---|
| *H01Q 15/16* | (2006.01) |
| *H01Q 3/24* | (2006.01) |
| *H01Q 1/28* | (2006.01) |
| *H01Q 3/18* | (2006.01) |

(52) U.S. Cl.
CPC .............. *H01Q 3/18* (2013.01); *H01Q 1/288* (2013.01); *H01Q 3/245* (2013.01); *H01Q 15/16* (2013.01)

(58) Field of Classification Search
CPC .................................. H01Q 1/288; H01Q 3/18
See application file for complete search history.

(56) References Cited

U.S. PATENT DOCUMENTS

| | | | | |
|---|---|---|---|---|
| 5,181,430 | A * | 1/1993 | Panin ...................... | B64G 1/641 74/99 R |
| 6,402,329 | B1 * | 6/2002 | Bailly ................... | G02B 7/1822 359/872 |
| 6,504,514 | B1 * | 1/2003 | Toland ..................... | H01Q 5/45 343/781 P |
| 2004/0113835 | A1 | 6/2004 | Jones et al. | |
| 2010/0013727 | A1 | 1/2010 | Pifer et al. | |
| 2011/0032173 | A1 | 2/2011 | Chang et al. | |
| 2012/0228436 | A1 * | 9/2012 | Francis .................. | H01Q 1/288 244/173.3 |
| 2016/0056537 | A1 * | 2/2016 | Guler ....................... | H01Q 3/01 343/762 |
| 2016/0172756 | A1 | 6/2016 | Goyette et al. | |
| 2019/0051991 | A1 | 2/2019 | Patel et al. | |
| 2020/0212534 | A1 * | 7/2020 | Brossier ................ | H01Q 15/20 |
| 2021/0211189 | A1 | 7/2021 | Mendelsohn et al. | |
| 2021/0296780 | A1 | 9/2021 | Stirland et al. | |

OTHER PUBLICATIONS

Campos, L, Bourbonnais, F, Bonev, IA, & Bigras, P. "Development of a Five-Bar Parallel Robot With Large Workspace." Proceedings of the ASME 2010, Montreal, Quebec, Canada. Aug. 15-18, 2010. pp. 917-922. ASME. https://doi.org/10.1115/DETC2010-28962 (Year: 2010).*

Campos, L, Bourbonnais, F, Bonev,IA ,& Bigras, P."Development of a Five-Bar Parallel Robot With Large Workspace." Proceedings of the ASME 2010, Montreal, Quebec, Canada. Aug. 15-18, 2010. pp. 917-922. ASME. httos://doi.org/10.1115/DETC2010-28962 (Year: 2010).*

Vathan, Louis B., et al., "Kinematic Analysis of Five-Bar Mechanism in Industrial Robotics," [https://www.academia.edu/10259240/Kinematic_Analysis_of_Five_Bar_Mechanism_in_Industrial_Robotics], downloaded Jan. 2022, 6 pages.

* cited by examiner

*Primary Examiner* — Ab Salam Alkassim, Jr.
*Assistant Examiner* — Leah Rosenberg
(74) *Attorney, Agent, or Firm* — Vierra Magen Marcus LLP

(57) ABSTRACT

An example apparatus includes a planar five bar linkage having a ground link and an endpoint. A feed horn is attached at or near the endpoint of the planar five bar linkage. A first motor is attached to a first side of the ground link to move the endpoint and a second motor attached to the second side of the ground link to move the endpoint.

17 Claims, 14 Drawing Sheets

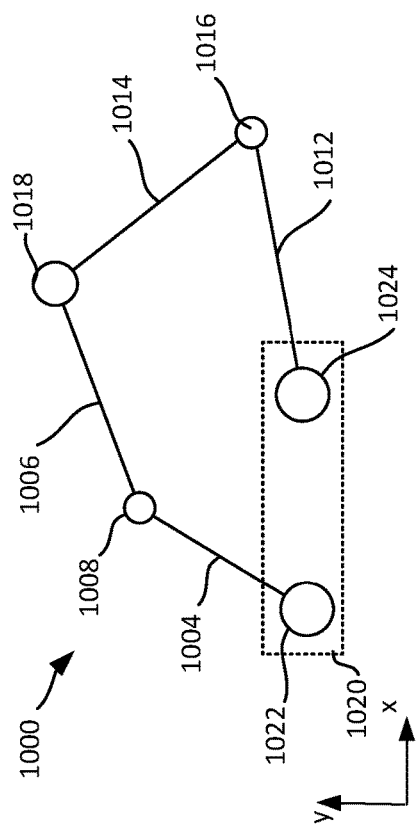
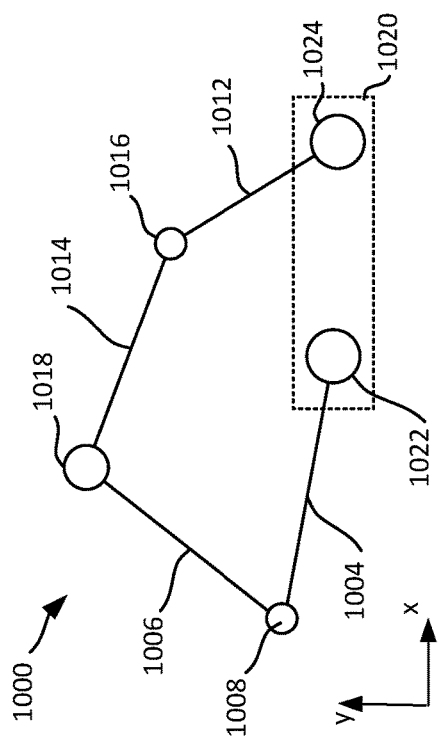
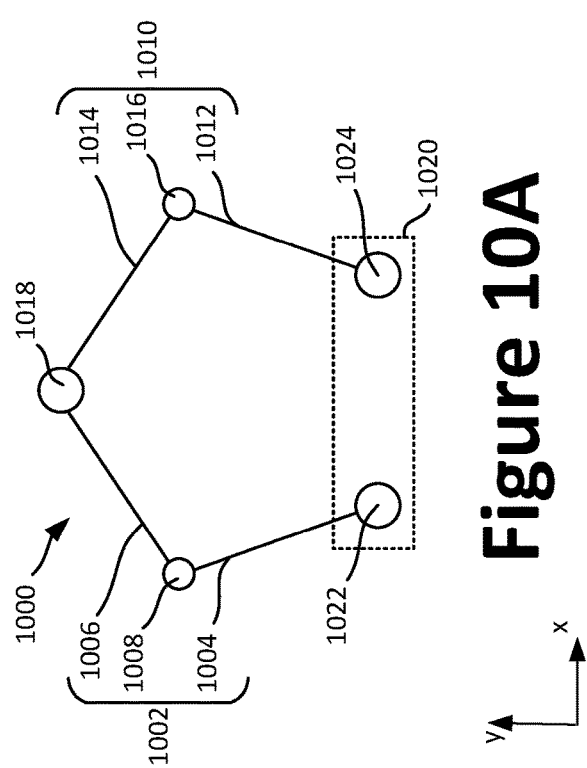
Figure 10A
Figure 10B
Figure 10C

US 11,705,630 B1

ANTENNA WITH MOVABLE FEED

BACKGROUND

The present disclosure relates to satellite technology.

Satellite communication systems typically include one or more satellites and a set of ground terminals. Such systems typically operate within regulations that allocate operating frequency bandwidth for a particular communications service. Satellites with embedded digital telecommunications payloads can provide advanced features such as reconfigurable switching, beamforming or beam hopping with a high degree of flexibility. Antennas may be provided on a satellite for transmitting and/or receiving RF signals. An example of an antenna includes a reflector and a feed assembly that may include one or more feed horns. In some cases, a steerable antenna may include a reflector that can be reoriented in space to redirect RF signals (e.g., to change target areas) without reorienting the satellite.

BRIEF DESCRIPTION OF THE DRAWINGS

FIGS. 10A-E show movement of a planar five bar linkage along a plane.

DETAILED DESCRIPTION

Figure 1:
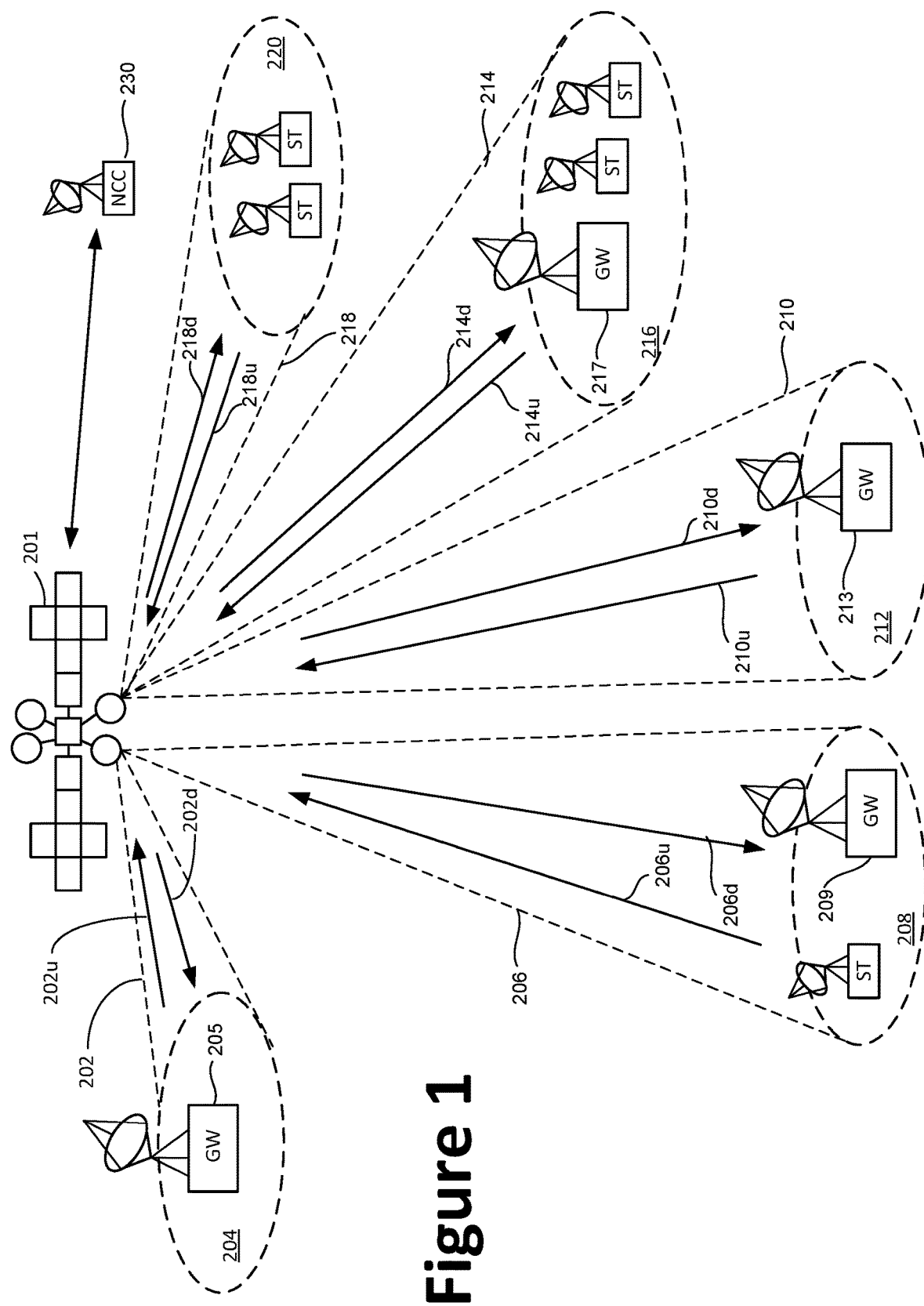
FIG. 1 is a block diagram describing one embodiment of a portion of a satellite communications system.

Aspects of the present technology may be applied to spacecraft such as satellites used for various purposes including but not limited to communication. In many satellites, including satellites used for digital communication (e.g., including a digital channelizer and/or other digital circuits) and analog communication, one or more spot beams are used for communication between a satellite and a target area of the earth's surface. A spot beam may include RF signals sent to and/or received from a target area by an antenna. The antenna may include a feed horn and a reflector (e.g., a parabolic reflector). A steerable antenna may allow redirection of the spot beam to different target areas. Antennas may also be used on Earth (terrestrial antennas) for communication with satellites and/or for communication with other locations on Earth. While examples below refer to specific examples, the present technology is not limited by location (e.g., to satellite antennas) or to antennas used for any specific purpose (e.g., for providing network access).

Aspects of the present technology enable reorienting one or more spot beams generated by an antenna independently, without moving an antenna reflector by moving one or more corresponding feed horns. Where two or more feed horns are provided in an antenna to support two or more spot beams, each spot beam may be individually redirected (e.g., one spot beam may be redirected without affecting other spot beams of the same antenna) using individually movable feed horns.

A movable feed horn assembly may include a feed horn attached to a planar five bar linkage (e.g., attached at or near the endpoint of the planar five bar linkage) to enable movement of the feed horn along a plane, with actuators (e.g., motors) attached to the planar five bar linkage (e.g., on either side of its ground link) to control the location of the feed horn. An antenna may include two or more movable feed horn assemblies that allow respective spot beams to be redirected without moving the reflector. The antenna may also include one or more feed horns that do not move.

System Overview

Aspects of the present technology may be implemented in a single satellite, in multiple satellites (e.g., in a satellite communication system) or in other locations (including on Earth). A satellite communication system may include a single satellite or a constellation of geostationary or non-geostationary satellites orbiting the Earth to cover one or more regions of the Earth. The satellite communication system may further include components on Earth including, for example, a plurality of gateways GWs and a plurality of subscriber terminals STs (also referred to as terminals). A satellite may enable communication between different points on the ground. For example, the subscriber terminals STs may communicate with the gateways GWs or with other terminals via the satellites. The system can be used to provide access to the Internet or other network, telephone services, video conferencing services, private communications, broadcast services, as well as other communication services.

In general, each satellite provides a plurality of receive and transmit beams which may be formed by analog means such as non-articulated or steerable spot beam antenna, or by analog beamforming networks at the input or output sides of the satellite operating on antenna element signals. The entirety or portions of the spectrum covered by receive beams (receive sub-bands) are routed to the entirety or portions of the spectrum covered by transmit beams (transmit sub-bands). This routing is traditionally performed by analog means (bent pipe payloads). Alternatively, on-board processing can be used to flexibly assign receive sub-bands to transmit sub-bands using a digital channelizer system, which may or may not include beam hopping schemes. Additionally, the digital channelizer system may also be used to form the beams digitally, in which case it will receive as input an array of receive antenna element signals and output an array of transmit antenna element signals. Mixed operating modes are also possible where some of the beams are formed analogically and other beams are formed digitally. Any given beam may also be formed by a combination of analog and digital means (partial analog beamforming). Aspects of the present technology are applicable to satellites using a bent pipe configuration, satellites using a digital channelizer, and satellites using mixed operating modes.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments, the system will include multiple satellites that are referred to as a constellation of satellites, which may communicate with each other either in a single direction or bi-direction.

Figure 2:
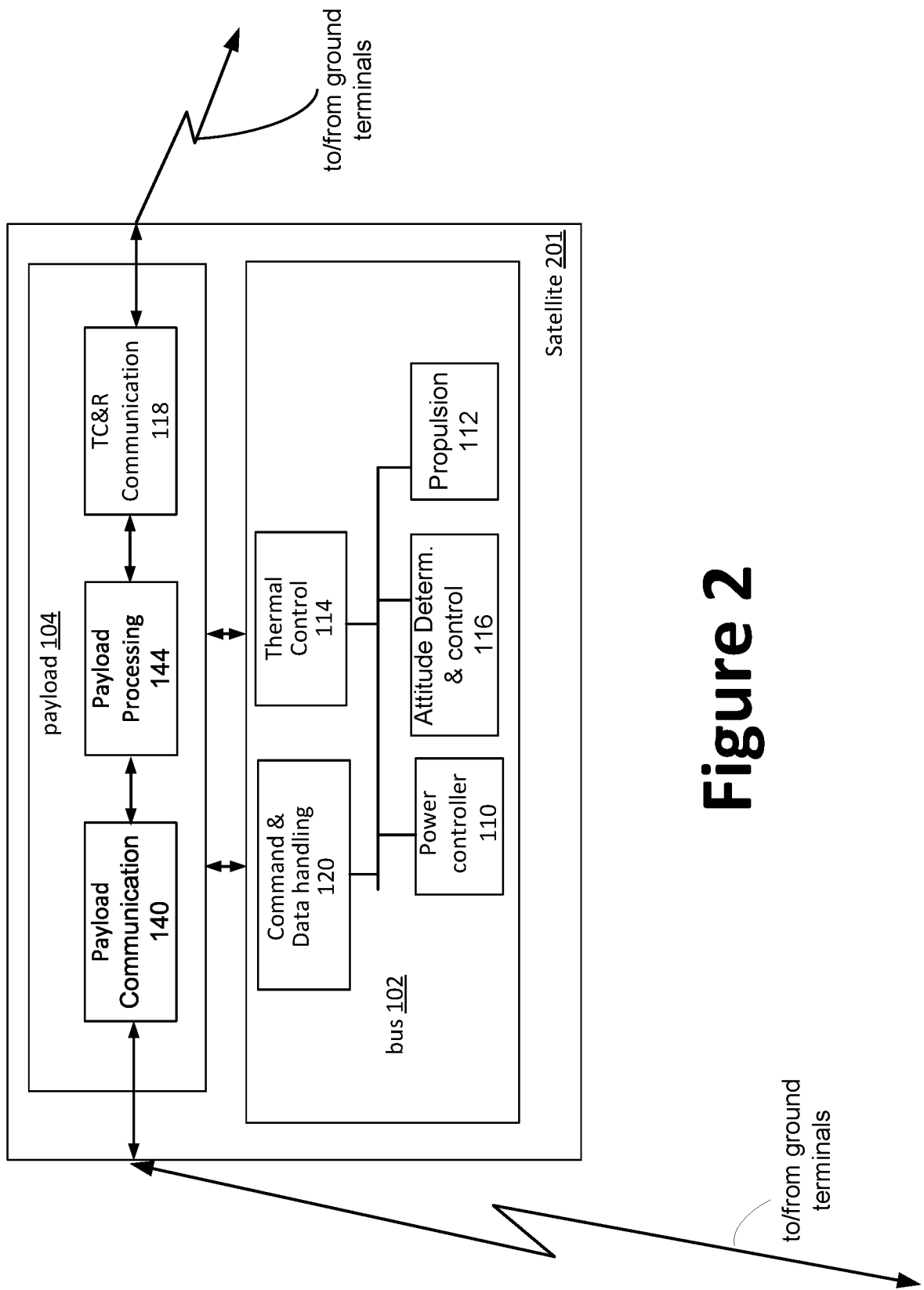
FIG. 2 is a block diagram depicting a satellite including a bus and payload.

In one embodiment, satellite 201 comprises a bus (i.e., spacecraft) and one or more payloads, including a communications payload (e.g., payload 104 and bus 102 of FIG. 2). The satellite 201 may also include multiple power sources, such as batteries, solar panels, and one or more propulsion systems, for operating the bus and the payload (e.g., bus 102 and payload 104). The satellite 201 includes an antenna system that provides a plurality of beams, including non-articulated and steerable spot beams, for communicating with ground terminals such as subscriber terminals STs and/or gateways GWs.

A subscriber terminal ("ST") is a device that wirelessly communicates with a satellite, usually to be used by one or more end users. The term subscriber terminal ST may be used to refer to a single subscriber terminal ST or multiple subscriber terminals STs. A subscriber terminal ST is adapted for communication with the satellite communication system including satellite 201. Subscriber terminals STs may include fixed and mobile subscriber terminals STs including, but not limited to, a cellular telephone, wireless handset, a wireless modem, a data transceiver, a paging or position determination receiver, or mobile radio-telephone, a cellular backhaul, a trunk, an enterprise computing or storage device, an airborne device, a maritime device, or a head end of an isolated local network. A subscriber terminal ST may be hand-held, portable (including vehicle-mounted installations for cars, trucks, boats, trains, planes, etc.) or fixed as desired. A subscriber terminal ST may be referred to as a wireless communication device, a mobile station, a mobile wireless unit, a user, a subscriber, a terminal or a mobile.

The term gateway ("GW") may be used to refer to a device that communicates wirelessly with a satellite and provides an interface to a network, such as the Internet, a wide area network, a telephone network or other type of network. In some embodiments, gateways GWs (e.g., GW 205, 209, 213, 217 of FIG. 1) manage the subscriber terminals STs.

FIG. 1 also shows a Network Control Center 230, which includes an antenna and modem (not shown) for communicating with satellite 201, as well as one or more processors and data storage units (not shown). In some embodiments, Network Control Center 230 provides commands to control and operate satellite 201, as well as all other satellite communication payloads in the constellation. Network Control Center 230 may also provide commands to any of the gateways GW (via a satellite or a terrestrial network) and/or subscriber terminals ST. While specific components are shown in FIG. 1, additional components, or different components may be used in other examples and the present technology is not limited to any particular satellite system configuration.

For example purposes only, FIG. 1 shows five spot beams: 202, 206, 210, 214 and 218. Spot beam 202 is a steerable spot beam that broadcasts a signal over target area 204 (target area) for communicating with one or more gateways GWs 205 via downlink 202d and uplink 202u (e.g., downlink 202d may comprise data packets from one or more Internet servers that are transferred via gateway GW 205 to one or more subscriber terminals STs and uplink 202u may comprise data packets from one or more subscriber terminals STs that are transferred to Internet servers via gateway GW 205). Spot beam 206 is a steerable dual-purpose beam that broadcasts a signal over target area 208 in order to communicate with one or more gateways GWs 209 and one or more subscriber Terminals STs via downlink 206d and uplink 206u. Spot beam 210 is a steerable spot beam that could be used to communicate with gateways GWs and/or subscriber terminals STs, but in the example of FIG. 1 spot beam 210 broadcasts a signal over target area 212 to communicate with one or more gateways GWs 213 via downlink 210d and uplink 210u. The two hundred spot beams that perform time domain beam hopping can be used to communicate with subscriber terminals STs and/or gateways GWs. Spot beams 214 and 218 are two examples of the two hundred non-articulated spot beams that performed time domain beam hopping. Spot beam 214 broadcasts a signal over target area 216 to communicate with one or more gateways GWs 217 and one or more subscriber terminals STs via downlink 214d and uplink 214u. Spot beam 218 broadcasts a signal over target area 220 to communicate with subscriber terminals STs via downlink 218d and uplink 218u.

FIG. 2 is a block diagram of one embodiment of satellite 201 of FIG. 1. In one embodiment, satellite 201 includes a bus 102 and a payload 104 carried by bus 102. Some embodiments of satellite 201 may include more than one payload 104. The payload 104 provides the functionality of the communication and/or processing systems described herein (e.g., payload communication circuit 140, payload processing system 144 and TC&R communication circuit 118).

In some embodiments, bus 102 is a spacecraft that provides power for the payload 104 and controls position of the satellite (e.g., to maintain a satellite in a given orbit with a given orientation). For example, the bus components include a power controller 110, which may be connected to solar panels (not shown) and one or more batteries (not shown in FIG. 2) to provide power to other satellite components including command & data handling circuit (CD&H) 120, thermal control circuit 114, attitude determination and control circuit 116 and propulsion 112. Other equipment can also be included. Solar panels, batteries (not shown) and power controller 110 are used to provide power to satellite 201. Thrusters (not shown) as part of propulsion 112 are used for changing the position or orientation of satellite 201 while in space. Attitude sensors (e.g., part of determination & control circuit 116) may be used to determine the position and orientation of satellite 201. T, C & R communication circuit 118 includes communication and processing equipment for telemetry, commands from the ground to the satellite and ranging to operate the satellite. CD&H 120 is used to control and operate satellite 201. An operator on the ground can control satellite 201 by sending commands via T, C & R communication circuit 118 to be executed by a system processor (e.g., as part of CD&H 120). In one embodiment, CD&H 120 is in communication with payload 104.

Figure 3:
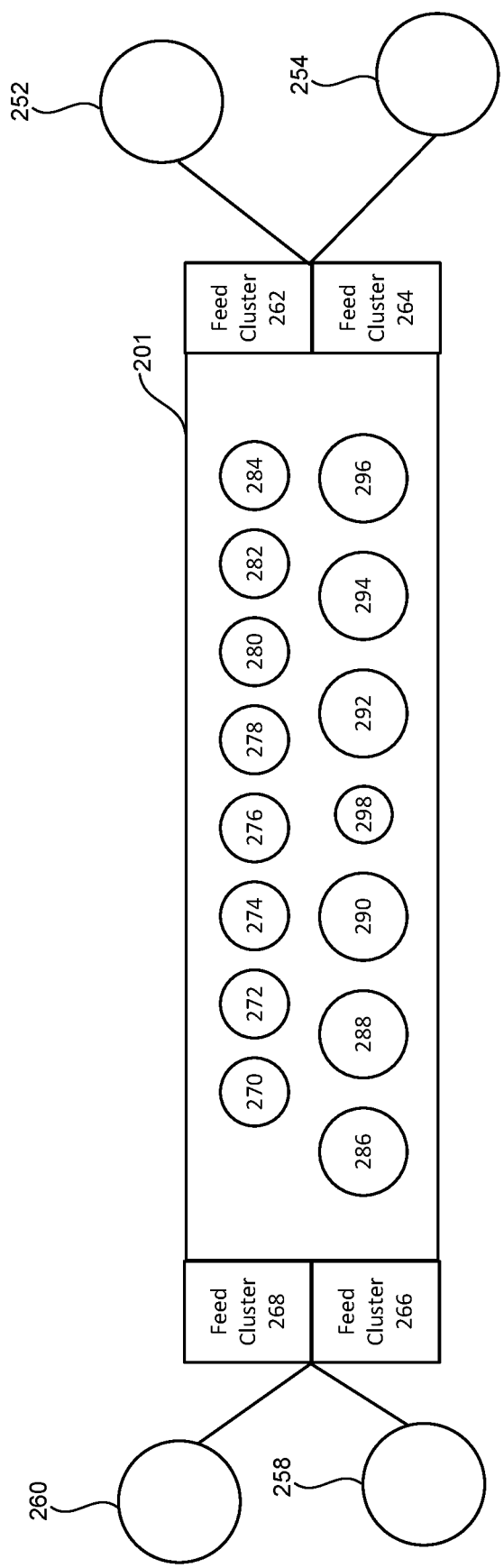
FIG. 3 depicts an example of an antenna system of a satellite.

In one embodiment, the payload 104 includes an antenna system that may be connected to payload communication circuit 140 and TC&R communication circuit 118 (e.g., as shown in FIG. 3, not depicted in FIG. 2) that provides a set of one or more beams (e.g., spot beams) comprising a beam pattern used to receive wireless signals from ground stations, and to send wireless signals to ground stations and/or other satellites. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams divide an overall service region into a number of cells. In one embodiment, the antenna system includes a phased array antenna, a direct radiating antenna, or a multi-feed fed reflector.

In some embodiments, Payload 104 also includes payload components such as payload communication circuit 140, TC&R communication circuit 118 and Payload Processing System 144. Payload communication circuit 140 and TC&R communication circuit 118, which are connected to the antenna system (not depicted), are configured to communicate with one or more ground terminals (e.g., send and receive messages to/from gateways GWs and/or subscriber terminals STs).

FIG. 3 is a block diagram depicting one embodiment of an antenna system of satellite 201. For example, FIG. 3 shows antennas 252, 254, 258 and 260 which provide the multiple spot beams. Each of antennas 252, 254, 258 and 260 provide a cluster of spot beams each. FIG. 3 shows feed cluster 262 pointed at antenna 252, feed cluster 264 pointed at antenna 254, feed cluster 266 pointed at antenna 258 and feed cluster 268 pointed at antenna 260.

Figure 4:
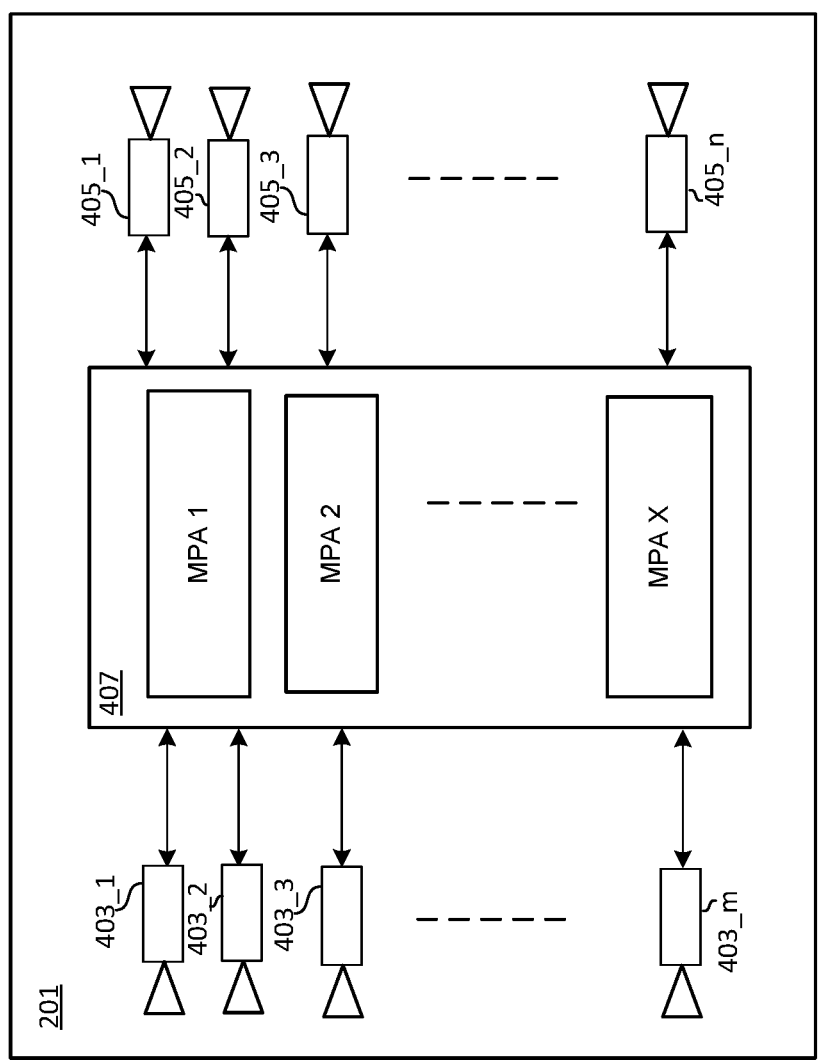
FIG. 4 shows an example of a satellite that includes an amplification system.

FIG. 4 illustrates an example implementation of satellite 201. Satellite 201 includes m signal input modules 403_1-403_m, where an individual signal input module may include an antenna (e.g., any of the antennas illustrated in FIG. 3) to receive an RF signal from a ground terminal (e.g., gateway, user terminal, or other source that is external to satellite 201). Satellite 201 also includes n signal output modules 405_1-405_n, where an individual signal output module may include an antenna (e.g., any of the antennas illustrated in FIG. 3) to direct an RF signal to a ground terminal (e.g., gateway, user terminal, or other recipient that is external to satellite 201). The numbers of inputs m and outputs n may depend on satellite design and configuration. An amplification system 407 is located between the input modules and output modules to amplify received signals before sending them to a recipient. It will be understood that FIG. 4 is a simplified illustration and that additional components may be provided including multiplexers, demultiplexers, filters, etc. Amplification system 407 includes X Multi Port Amplifiers (MPA 1-MPA X), where X may be any suitable number depending on satellite design.

Figure 5:
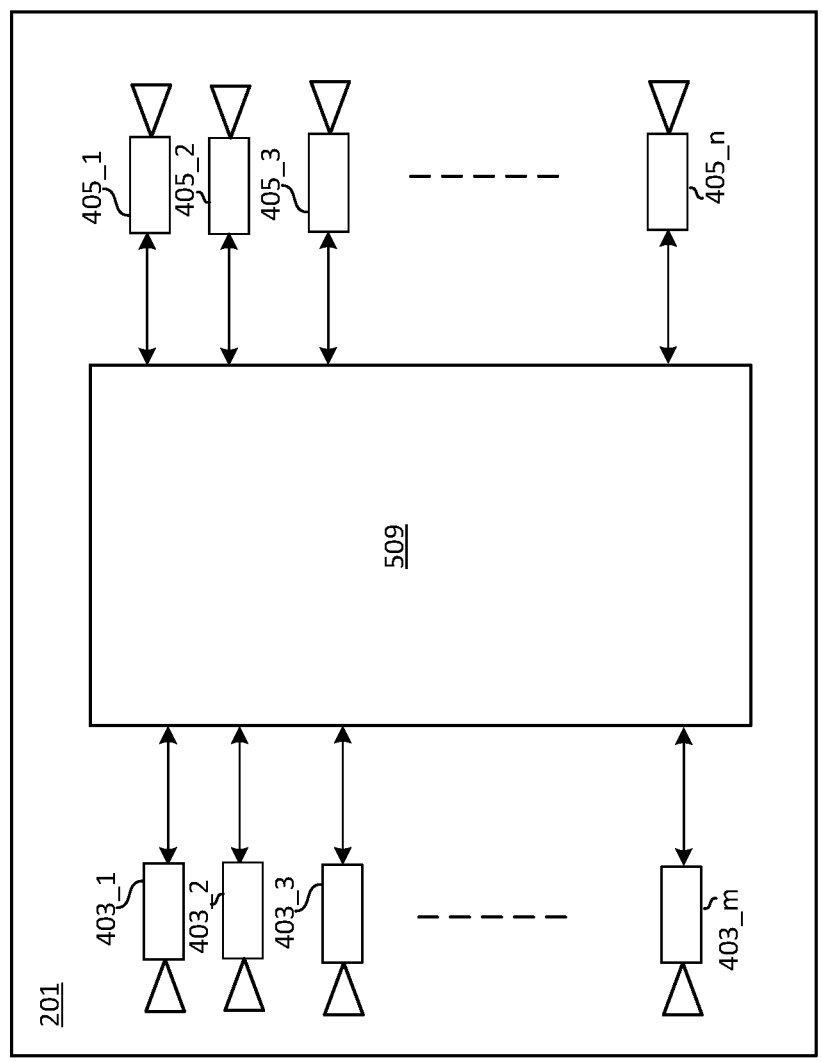
FIG. 5 illustrates an example of a satellite with a digital channelizer.

FIG. 5 illustrates another implementation of satellite 201. In the example of FIG. 5, satellite 201 includes m signal input modules 403_1-403_m and n signal output modules 405_1-405_n as in the example of FIG. 4. FIG. 5 also shows digital channelizer 509 located between signal input modules 403_1-403_m and signal output modules 405_1-405_n. Digital channelizer 509 may direct signals received at signal input modules 403_1-403_m and direct them to appropriate signal input modules 403_1-403_m so that incoming signals (e.g., from a gateway) are appropriately directed (e.g., to areas where user terminals are located). Aspects of the present technology may be implemented in a range of satellite configurations including those using analog circuits, digital circuits, or a mix of analog and digital circuits and the present technology is not limited to the examples illustrated.

Figure 6:
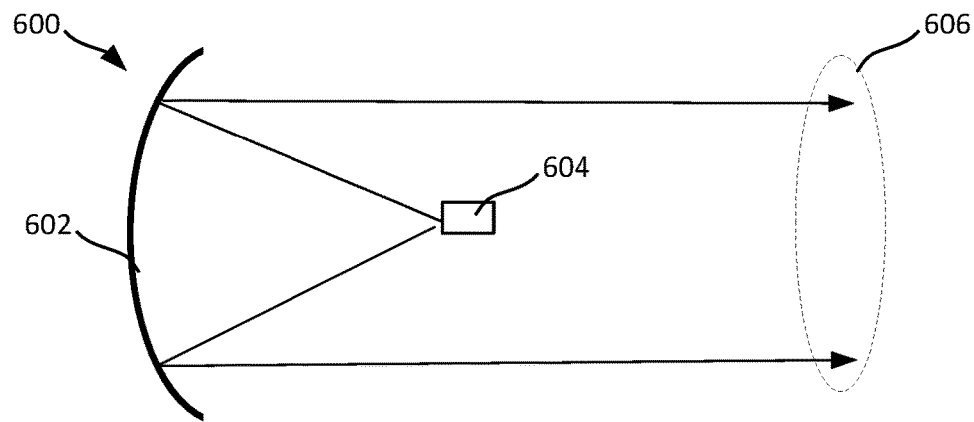
FIG. 6 shows an example of an antenna.

FIG. 6 illustrates an example of an antenna 600 (e.g., any of the antennas described above). Antenna 600 includes reflector 602 (antenna reflector) and feed horn 604. In the example illustrated in FIG. 6, feed horn 604 transmits one or more RF signals that are reflected from reflector 602 and form a spot beam 606 that is directed towards a target area (e.g., an area of the earth's surface). In the example where antenna 600 receives RF signals, the arrangement of FIG. 6 may be reversed (e.g., an incoming spot beam from a target area is reflected from reflector 602 and is focused on feed horn 604). Reflector 602 may have a suitable shape so that RF radiation is appropriately reflected. For example, reflector 602 may have a parabolic shape with feed horn 604 located at or near the focus of reflector 602. Antenna 600 may be a fixed antenna or may be steerable (e.g., for a steerable spot beam).

Figure 7:
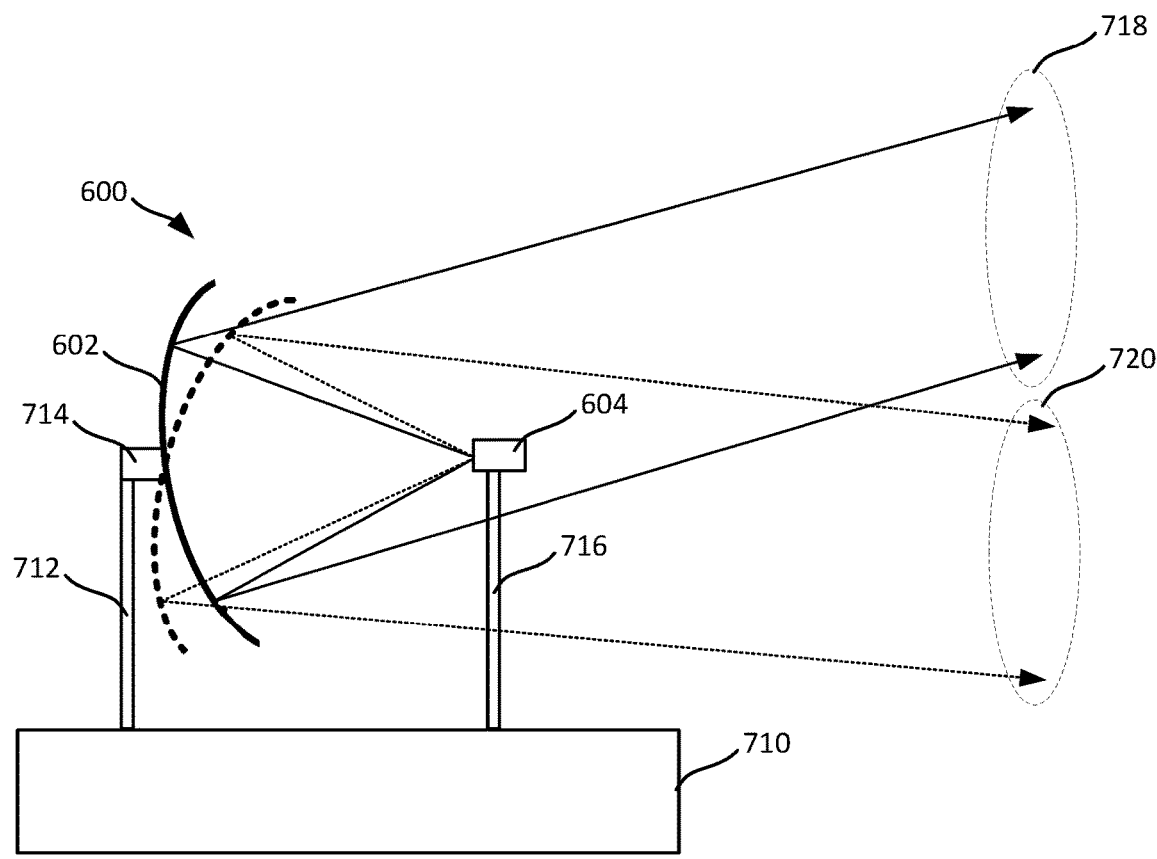
FIG. 7 shows an example of a steerable antenna attached to a satellite body.

FIG. 7 illustrates an example implementation of antenna 600 as a steerable antenna (e.g., as steerable antennas 286, 288, 290, 292, 294, 296 or steerable antennas 270, 272, 274, 276, 278, 280, 282 284). Reflector 602 is attached to a satellite body 710 by boom 712 and actuator 714. Feed horn 604 is attached to satellite body 710 by boom 716. The position of feed horn 604 may be fixed with respect to satellite body 710 and antenna 600 may be steered by actuator 714 changing the orientation of reflector 602. For example, with reflector 602 in a first orientation (illustrated by solid lines in FIG. 7), a spot beam 718 is directed in a first direction (e.g., towards a first target area that) and with reflector 602 in a second orientation (illustrated by dotted lines in FIG. 7), a redirected spot beam 720 is directed in a second direction (e.g., towards a second target area). Actuator 714 may control the orientation and/or position of reflector 602 to steer antenna 600 and allow spot beams to be directed as desired without changing the position or orientation of satellite body 710.

Figure 8:
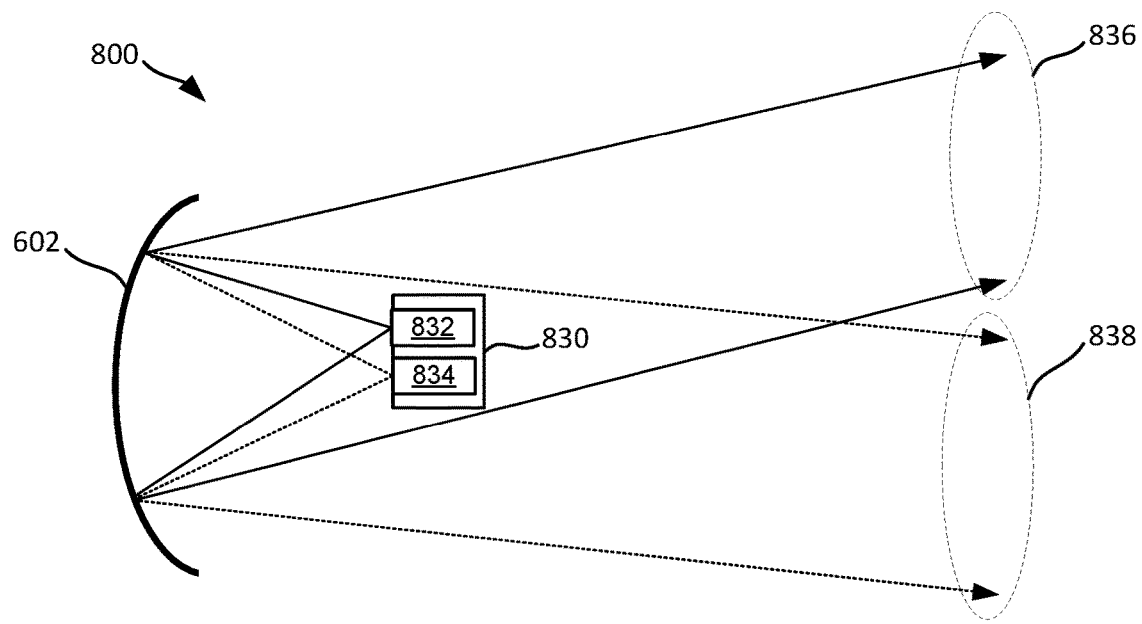
FIG. 8 shows an example of an antenna with two feed horns.

In some cases, an antenna may include more than one feed horn fixed in a feed assembly to allow spot beams to be directed to more than one target area using the same reflector. FIG. 8 shows an example of antenna 800 that includes reflector 602 and feed assembly 830, which includes first feed horn 832 and second feed horn 834. First feed horn 832 generates first spot beam 836, which may be directed to a first target area, while second feed horn 834 generates second spot beam 838, which may be directed to a second target area. While a feed assembly containing multiple feed horns may enable multiple spot beams, these spot beams are generally not individually steerable. For example, moving a reflector that serves multiple feed horns (e.g., reflector 602 serving feed horns 832, 834 of antenna 800) may affect all such spot beams (e.g., spot beams 836 and 838) so that it may not be possible to redirect an individual spot beam independently without impacting other spot beams generated by the same antenna. This may limit the utility of a steerable antenna with multiple feed horns.

Figure 9:
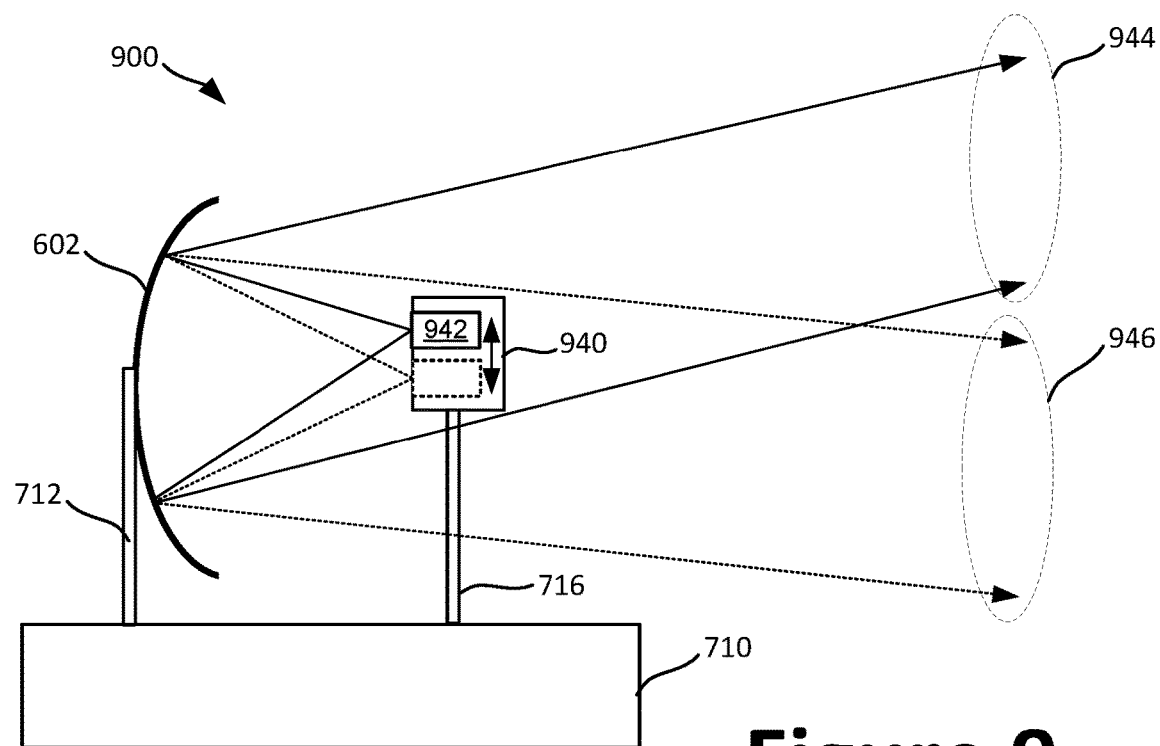
FIG. 9 shows an example of an antenna with a movable feed horn.

FIG. 9 illustrates an example of antenna 900, which is steerable (e.g., any of steerable antennas 286, 288, 290, 292, 294, 296 or steerable antennas 270, 272, 274, 276, 278, 280, 282 284 illustrated in FIG. 3) without moving reflector 602. For example, reflector 602 is attached to satellite body 710 by boom 712 in a fixed position and a fixed orientation with respect to satellite body 710 (e.g., without any actuator or other element that would allow reorientation or relative movement of reflector 602). In non-satellite examples, boom 712 and boom 716 may be attached to other structures (e.g., to the ground, a building, an aircraft, or other object). Feed assembly 940 includes feed horn 942 and includes components to move feed horn 942 in order to direct a spot beam at different respective target areas. For example, FIG. 9 shows feed horn 942 in a position where it generates spot beam 944 (shown with solid lines). Also shown is a second position for feed horn 942 (in dotted lines) where it generates redirected spot beam 946. Antenna 900 enables steering of a spot beam without moving reflector 602, which may provide various benefits over arrangements that keep feed horn position fixed and move a reflector. A single feed horn may be moved as illustrated in FIG. 9 or more than one feed horn in a feed assembly may be individually moved as needed and the present technology is not limited to antennas having any particular number of feed horns.

In an example, reflector 602 is a parabolic reflector that has a focal plane and feed horn 942 is movable along the focal plane (or along a plane near and parallel to the focal plane) of reflector 602 (e.g., the range of motion of feed horn 942 is constrained to the focal plane of reflector 602). Various mechanisms may be used to move feed horn 942 as illustrated. Examples of movable feed horn assemblies to move a feed horn are described below although the present technology is not limited to any particular design.

An example of a movable feed horn assembly uses a planar five bar linkage to move a feed horn along a plane. FIG. 10A illustrates an example of a planar five bar linkage 1000, which includes a first arm 1002 (left arm) formed by a first bar 1004 (left crank) and a second bar 1006 (left floating link or left coupler) coupled by a first hinge 1008 and a second arm 1010 (right arm) formed by a third bar 1012 (right crank) and a fourth bar 1014 (right floating link or right coupler) coupled by a second hinge 1016. Second bar 1006 and fourth bar 1014 are connected by a third hinge 1018. Third hinge 1018 may be considered an endpoint or end effector of planar five bar linkage 1000 and may be referred to as endpoint 1018. In an example, a feed horn is attached at or near endpoint 1018 (at or on one of the floating links near the endpoint of planar five bar linkage 1000). A fifth bar of planar five bar linkage 1000 is formed by ground link 1020, which may be considered a non-moving part of planar five bar linkage 1000 (e.g., movement of endpoint 1018 may be relative to ground link 1020 (base), which may be considered a stationary object for purposes of the movement of endpoint 1018).

First bar 1004, second bar 1006, third bar 1012 and fourth bar 1014 may each be formed of an elongated portion of substantially rigid material and may be of equal length or may be of unequal lengths. First hinge 1008, second hinge 1016, third hinge 1018 may provide physical coupling of bars that allows rotation of one bar with respect to another about an axis of rotation (e.g., a pin may extend through a hinge and both bars may be rotatable about an axis of rotation that extends along a centerline of the pin). First bar 1004 is attached to one side (left side in FIG. 10A) of ground link 1020 by a first motor 1022, which is configured to rotate first bar 1004 with respect to ground link 1020. Thus, first arm 1002 is attached to first motor 1022 at one end and is attached to second arm 1010 at the other end (at endpoint 1018). Third bar 1012 is attached to the other side (right side in FIG. 10A) of ground link 1020 by a second motor 1024, which is configured to rotate third bar 1012 with respect to ground link 1020. Thus, second arm 1010 is attached to second motor 1024 at one end and is attached to first arm 1002 at the other end (at endpoint 1018). First hinge 1008, second hinge 1016, third hinge 1018, first motor 1022 and second motor 1024 may each have a respective axis of rotation (not shown) that is perpendicular to the view shown (e.g., along the z-direction, perpendicular to the x-y plane). This configuration constrains movement of the endpoint 1018 to a plane, while enabling first motor 1022 and second motor 1024 to control the position of endpoint 1018 in the plane. The range of motion of endpoint 1018 within this plane may be limited by the dimensions of first bar 1004, second bar 1006, third bar 1012, fourth bar 1014 and ground link 1020 (e.g., by distance between first motor 1022 and second motor 1024). Endpoint 1018 may be moved from the location illustrated in FIG. 10A in both the x-direction and the y-direction by rotating first bar 1004 using first motor 1022 and rotating third bar 1012 using second motor 1024 to place endpoint 1018 at a desired location.

FIG. 10B shows planar five bar linkage 1000 in a second configuration that is different to the first configuration illustrated in FIG. 10A. Endpoint 1018 is moved to the right (along the positive x-direction) compared with the configuration of FIG. 10A in this configuration. First bar 1004 is rotated clockwise by first motor 1022 and third bar 1012 is rotated clockwise by second motor 1022 to the positions illustrated to locate endpoint 1018 as shown.

FIG. 10C shows planar five bar linkage 1000 in a third configuration that is different to the first configuration illustrated in FIG. 10A. Endpoint 1018 is moved to the left (along the negative x-direction) compared with the configuration of FIG. 10A in this configuration. First bar 1004 is rotated counterclockwise by first motor 1022 and third bar 1012 is rotated counterclockwise by second motor 1022 to the positions illustrated to locate endpoint 1018 as shown.

Figure 10D:
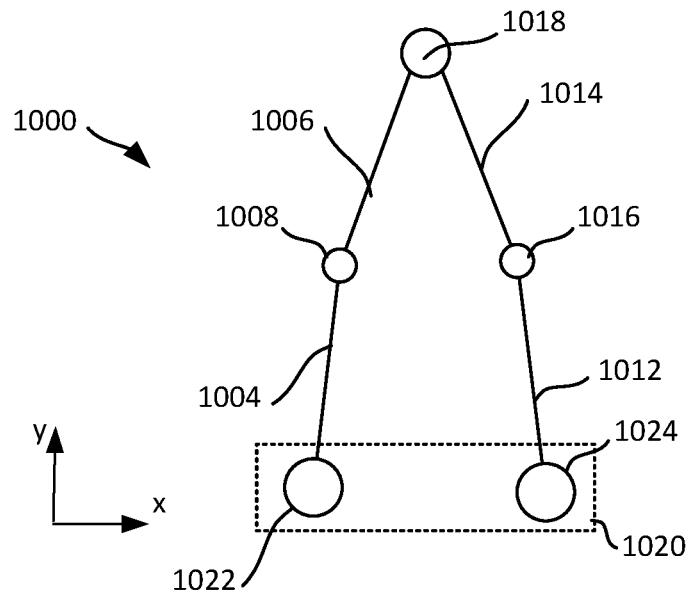

FIG. 10D shows planar five bar linkage 1000 in a fourth configuration that is different to the first configuration illustrated in FIG. 10A. Endpoint 1018 is moved upward (along the positive y-direction) compared with the configuration of FIG. 10A in this configuration. First bar 1004 is rotated clockwise by first motor 1022 and third bar 1012 is rotated counterclockwise by second motor 1022 as illustrated to locate endpoint 1018 as shown (more distant from ground link 1020 than in FIG. 10A).

Figure 10E:
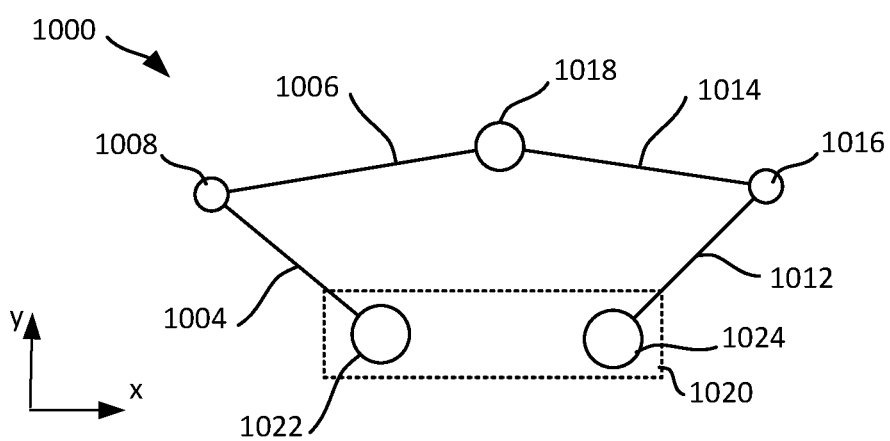

FIG. 10E shows planar five bar linkage 1000 in a fifth configuration that is different to the first configuration illustrated in FIG. 10A. Endpoint 1018 is moved downward (along the negative y-direction) compared with the configuration of FIG. 10A in this configuration. First bar 1004 is rotated counterclockwise by first motor 1022 and third bar 1012 is rotated clockwise by second motor 1022 as illustrated to locate endpoint 1018 as shown (closer to ground link 1020 than in FIG. 10A).

The angles of first bar 1004 and third bar 1012 with respect to ground link 1020 may be controlled by first motor 1022 and second motor 1024 in order to position endpoint 1018 at a desired location (e.g., desired x and y coordinates) as illustrated by the examples of FIGS. 10A-E (e.g., movement along x-direction illustrated in FIGS. 10B-C and movement along y-direction illustrated in FIGS. 10D-E). For example, first motor 1022 and second motor 1024 may be stepper motors that may be rotated a predetermined number of steps in response to a command in order to position endpoint 1018 at a predetermined position that is a function of the numbers of steps. Alternatively, first motor 1022 and second motor 1024 may be servo motors or stepper motors or other rotary motors that may be controlled to control position of endpoint 1018.

Examples of the present technology include a feed horn (e.g., feed horn 942) attached at or near an endpoint of a planar five bar linkage (e.g., endpoint 1018 of planar five bar linkage 1000) so that the position of the feed horn within a plane may be changed in response to a command (e.g., while a satellite that includes the feed horn is in space) as illustrated by the examples of FIGS. 10A-E.

Figure 11B:
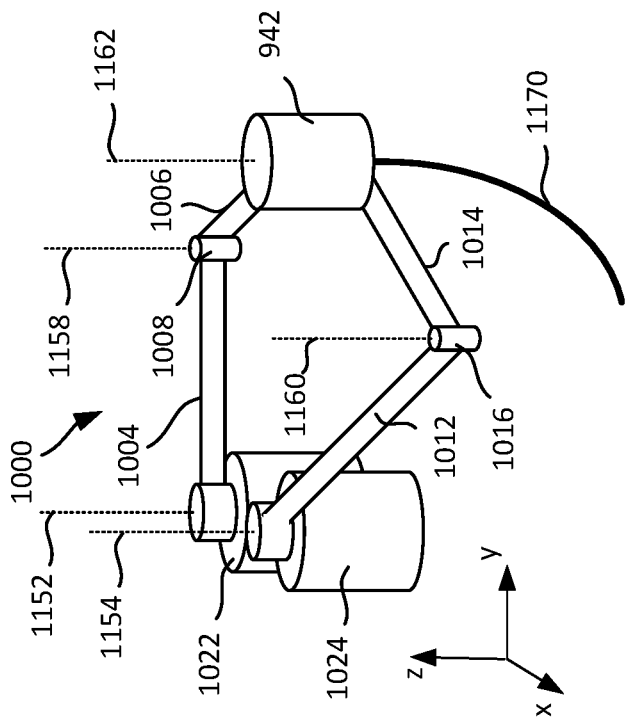
FIGS. 11A-D illustrate an example of a movable feed horn using a planar five bar linkage.
Figure 11A:
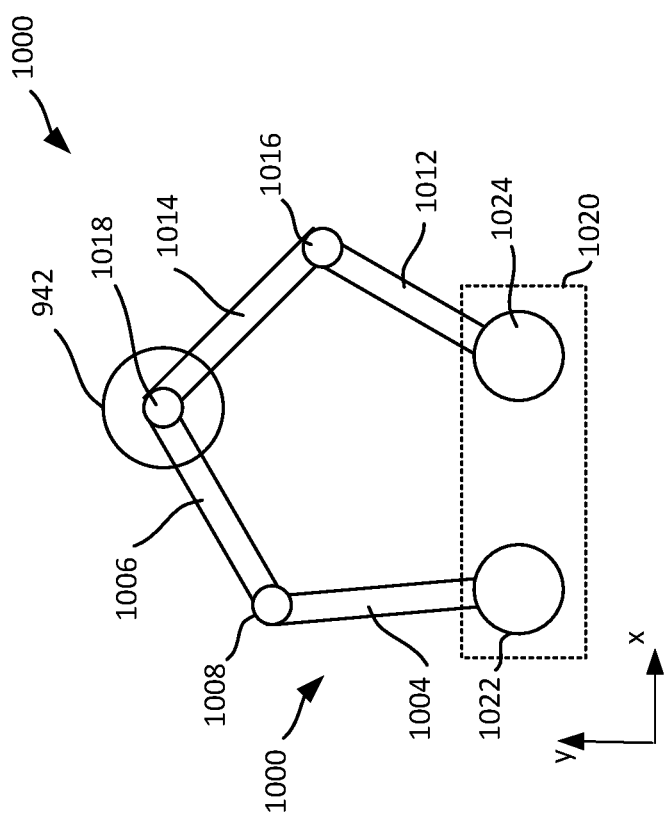

FIG. 11A shows a first example of feed horn 942 attached to planar five bar linkage 1000. In the example of FIG. 11A, feed horn 942 is centered over third hinge (endpoint) 1018 and may be attached to a pin (not shown) of third hinge 1018 that forms the axis of rotation about which second bar 1006 and fourth bar 1014 rotate. For example, feed horn 942 may be located above third hinge 1018 (in the positive z-direction, perpendicular to the x-y plane of FIG. 11A). Feed horn 942 is concentric with third hinge 1018 and may be free to rotate with respect to both second bar 1006 and fourth bar 1014 in this configuration.

FIG. 11B shows a perspective view of feed horn 942 attached to planar five bar linkage 1000 corresponding to the plan view of FIG. 11A. Axis of rotation 1152 of first motor 1022, axis of rotation 1154 of second motor 1024, axis of rotation 1158 of first hinge 1008, axis of rotation 1160 of second hinge 1016 and axis of rotation 1162 of third hinge 1018 are shown extending in parallel along the z-direction so that rotation of these components is constrained to the x-y plane (the x-y plane illustrated may coincide with the focal plane of a reflector so that feed horn 942 is constrained to movement in the focal plane of a corresponding reflector). Feed horn 942 is shown as a cylindrical component that has axis of rotation 1162 of third hinge 1018 extending through its center. A flexible RF conduit 1170 (e.g., a flexible wave guide or a coaxial cable) extends from feed horn 942 and may couple feed horn 942 to communication circuits (e.g., to a transmitter or receiver). First motor 1022 and second motor 1024 may be attached to any suitable structure (not shown) so that the distance between them (length of ground link 1020) is constant. The combination of a feed horn (e.g., feed horn 942), a linkage to enable movement of a feed horn along a plane (e.g., planar five bar linkage 1000) and first and second motors attached to the linkage to move the feed horn along the plane (e.g., first motor 1022 and second motor 1024) may be considered a movable feed horn assembly that may be used to move a feed horn in an antenna (e.g., move feed horn 942 in feed assembly 940).

Figure 11D:
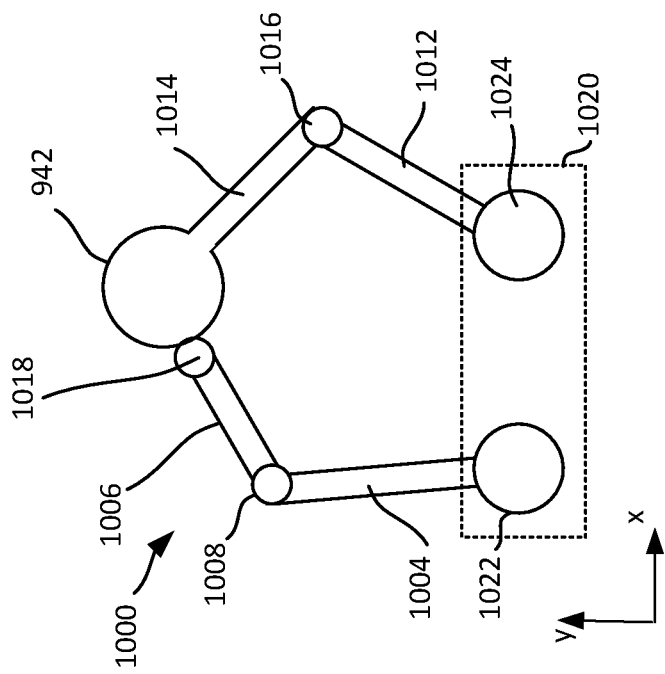
Figure 11C:
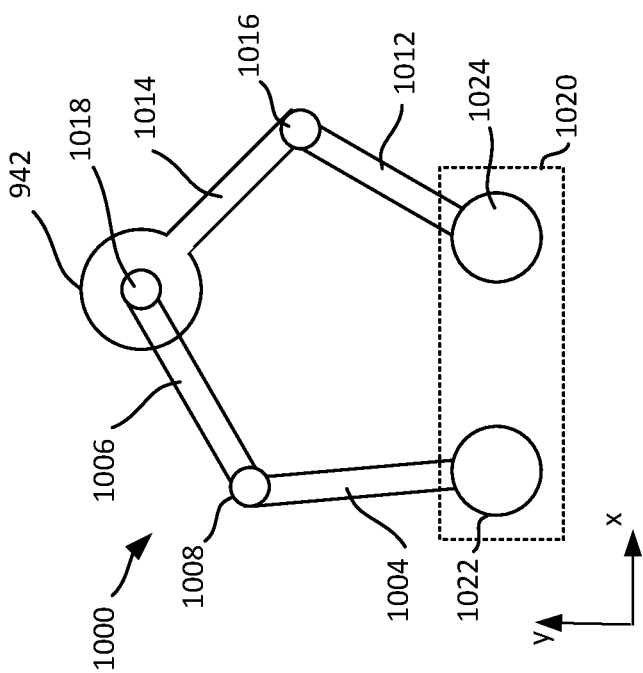

FIG. 11C shows an alternative example of attachment of feed horn 942 and planar five bar linkage 1000. In FIG. 11C, feed horn 942 and fourth bar 1014 are fixedly attached and are not rotatable with respect to each other. The combination of feed horn 942 and fourth bar 1014 is rotatable with respect to second bar 1006 through third hinge 1018. Thus, from a mechanical perspective, feed horn 942 may be considered a part of fourth bar 1014 in this example.

FIG. 11D shows another alternative example of attachment of feed horn 942 and planar five bar linkage 1000. Like the example of FIG. 11C, feed horn 942 and fourth bar 1014 are fixedly attached and are not rotatable with respect to each other and the combination of feed horn and fourth bar 1014 are rotatable with respect to second bar 1006 through third hinge 1018. Unlike the example of FIG. 11C (and FIGS. 11A-B), feed horn 942 is not centered over third hinge 1018 and instead is near third hinge 1018. In FIG. 11D, feed horn 942 is offset from third hinge 1018 (e.g., axis of rotation 1162 of third hinge 1018 is offset from the center of feed horn 942). The combination of a feed horn, linkage, and motors (e.g., feed horn 942, planar five bar linkage 1000, first motor 1022 and second motor 1024 as shown in FIGS. 11A-D) may be considered an example of a movable feed horn assembly. While the examples of FIGS. 11A-D show different configurations of feed horn 942 with respect to planar five bar linkage 1000 (located at or near third hinge 1018), the present technology is not limited to any particular example shown. While the examples of FIGS. 10A-E and 11A-D use first motor 1022 and second motor 1024 as rotational actuators to rotate first bar 1004 and third bar 1012, any suitable rotating actuator may be used. For example, a tortional spring and a remote cable may be used as a rotational actuator. In other examples, a pneumatic actuator or hydraulic actuator may be used, or an actuator may include a combination of actuating elements (e.g., electromechanical, mechanical, pneumatic, hydraulic and/or other elements).

In some examples (e.g., as illustrated in FIG. 9), a feed assembly (e.g., feed assembly 940) of an antenna (e.g., antenna 900) may include a single movable feed horn assembly (e.g., as illustrated in examples of FIGS. 11A-D) to allow the direction of a spot beam to be changed (e.g., while keeping a reflector stationary). In other examples, more than one movable feed horn assembly may be provided in an antenna so that directions of more than more than one spot beam can be independently changed.

Figure 12:
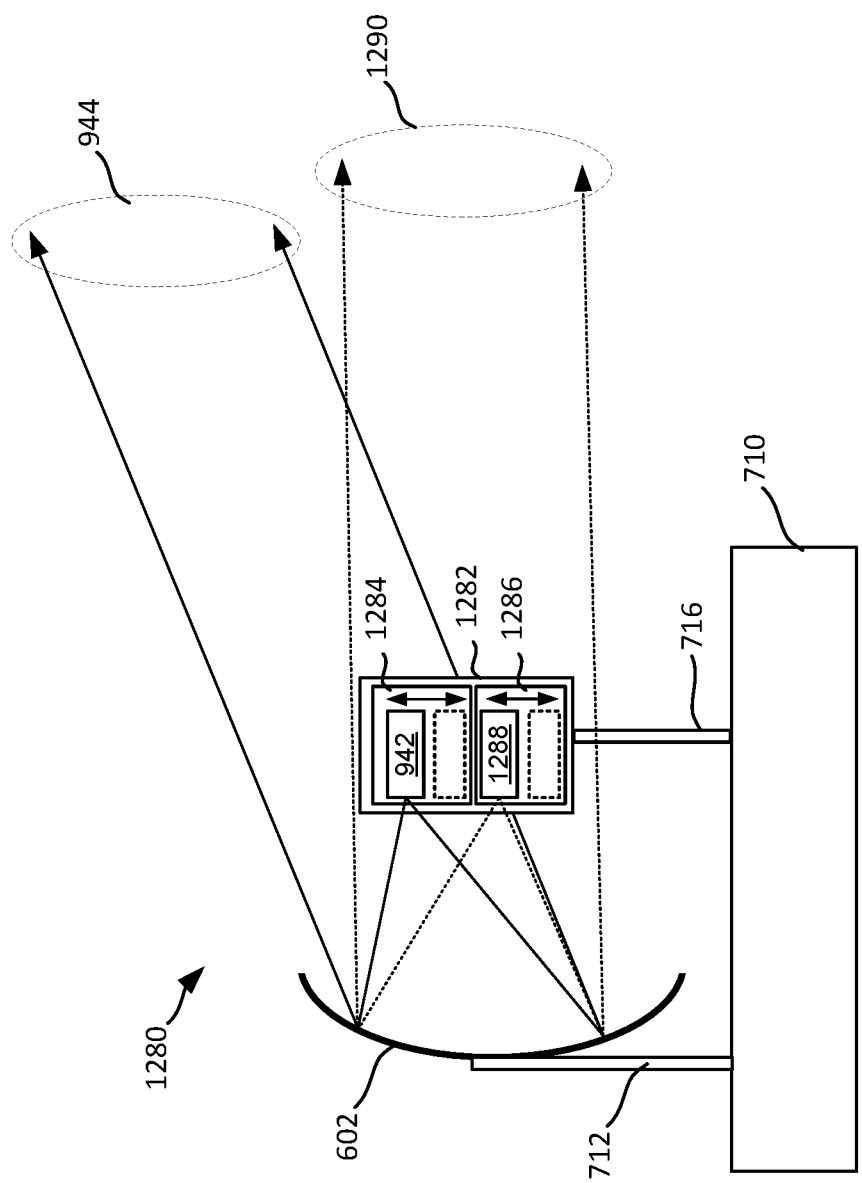
FIG. 12 illustrates an example of an antenna that includes two movable feed horns.

FIG. 12 shows an example of an antenna 1280, which includes reflector 602 that is fixedly attached to satellite body 710 by boom 712. Antenna 1280 includes feed assembly 1282 attached to satellite body 710 by boom 716. Feed assembly 1282 includes two movable feed horn assemblies: movable feed horn assembly 1284, which includes feed horn 942 and movable feed horn assembly 1286, which includes feed horn 1288. Each movable feed horn assembly may include a linkage (e.g., planar five bar linkage 1000) and motors (e.g., first and second motors 1022, 1024) to move a feed horn (e.g., feed horn 942, 1288) along a common plane (e.g., along focal plane of reflector 602). Spot beam 944 is movable by moving corresponding feed horn 942 as previously described with respect to FIG. 9. In addition, spot beam 1290 is movable by moving feed horn 1288 of movable feed horn assembly 1286. While feed assembly 1282 is shown having two movable feed horn assemblies to enable two independently steerable spot beams, other examples of feed assemblies may include three or more movable feed horn assemblies to enable three or more independently steerable spot beams using a common reflector (e.g., reflector 602).

Figure 13B:
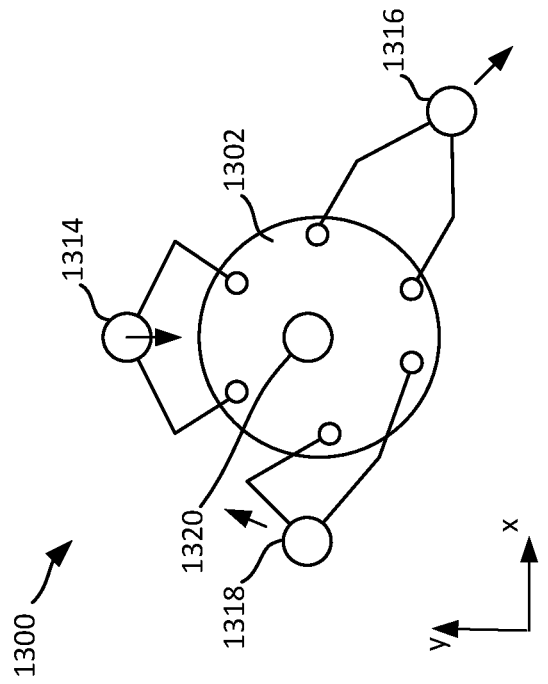
FIGS. 13A-D illustrate an example of a feed assembly that includes three movable feed horn assemblies attached to a hub (common ground link).
Figure 13A:
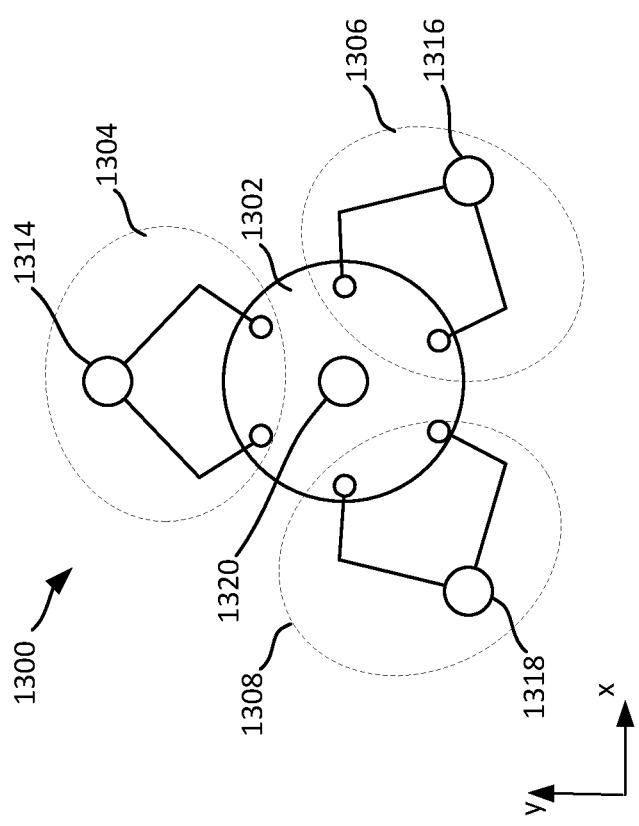

FIG. 13A shows an example of a feed assembly 1300 that includes a hub 1302 and three movable feed horn assemblies 1304, 1306, 1308 attached to hub 1302. Each movable feed horn assembly includes a respective feed horn and a linkage and motors to move it (e.g., as described in any example above). For example, movable feed horn assembly 1304 includes feed horn 1314, movable feed horn assembly 1306 includes feed horn 1316 and movable feed horn assembly 1308 includes feed horn 1318. Feed horns 1314, 1316 and 1318 are each independently movable along the x-y plane (a common plane, which may be at or near the focal plane of a corresponding reflector) by their respective movable feed horn assemblies so that corresponding spot beams can be independently redirected. Feed assembly 1300 also includes feed horn 1320, which is attached to hub 1302 by a fixed attachment and cannot be moved with respect to hub 1302 so that a corresponding spot beam may not be redirected without moving a corresponding reflector or satellite body. Thus, feed assembly 1300 includes both stationary and movable feed horns.

FIG. 13B shows feed assembly 1300 in a different configuration to that shown in FIG. 13A after feed horns 1314, 1316 and 1318 are independently moved in the directions indicated by respective arrows. For example, feed horn 1314 is moved inward toward hub 1302, feed horn 1316 is moved outward away from hub 1302 and feed horn 1318 is moved clockwise about hub 1202. Corresponding spot beams may be redirected accordingly. Feed horn 1320 remains at the location shown in FIG. 13A and a corresponding spot beam may remain as before (if a corresponding reflector and satellite body remain as before). The present technology allows one or more spot beams to be steered (redirected) independently of other spot beams associated with the same antenna, without moving a reflector of the antenna or a satellite body to which the antenna is attached. This may allow a single antenna to redirect multiple spot beams so that each spot beam does not require a dedicated steerable antenna. This may allow a reduction in the number of antennas used. For example, two or more of 4.2 degree steerable antennas 270, 272, 274, 276, 278, 280, 282 and 282 may be replaced by an antenna having two or more movable feed horn assemblies and two or more of 2.8 degree steerable antennas 286, 288, 290, 292, 294 and 296 may be replaced by an antenna having two or more movable feed horn assemblies.

Figure 13C:
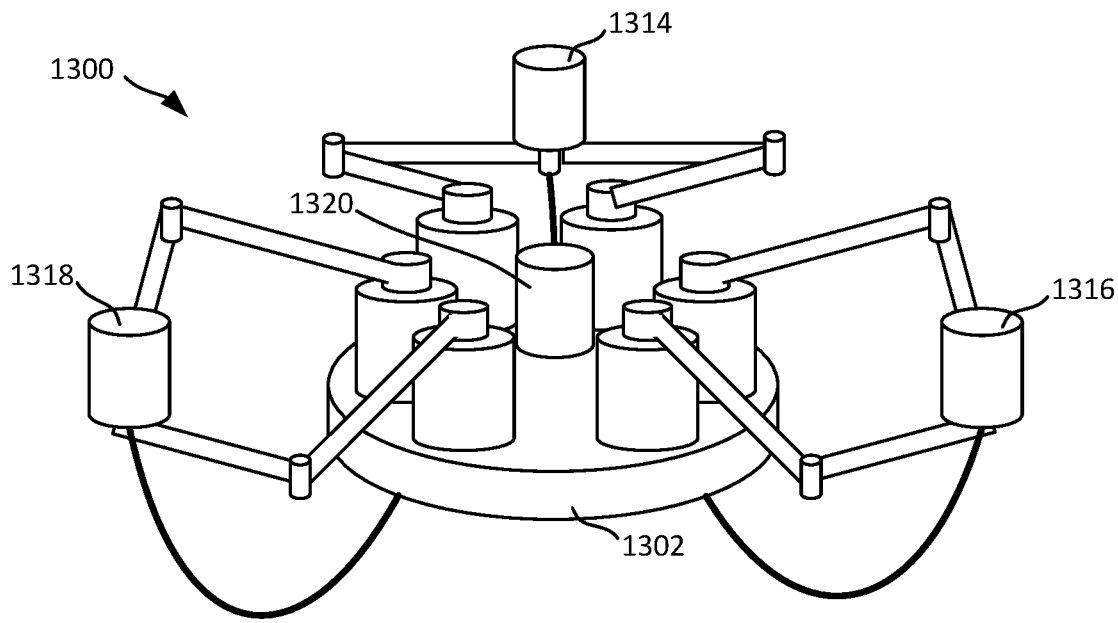

FIG. 13C shows a perspective view of feed assembly 1300 corresponding to the plan view of FIG. 13A. FIG. 13C shows feed horns 1314, 1316, 1318 and 1320 attached to hub 1302 so that feed horns 1314, 1316, 1318 are movable with respect to hub 1302 (along a plane) while feed horn 1320 remains stationary.

FIGS. 13A-C illustrate examples in which movable feed horn assemblies 1304, 1306, 1308 provide non-overlapping ranges of movement for their respective feed horns 1314, 1316, 1318. These ranges of movement may correspond to spot beam ranges that allow each corresponding spot beam to be redirected to a target area within a respective range. For example, movable feed horn assembly 1304 may have a range of movement that corresponds to target areas in north America while movable feed horn assembly 1306 may have a range of movement that corresponds to target areas in Europe. While movable feed horn assembly 1304 may be movable to redirect a corresponding spot beam from a target area in Maine to a target area in Oregon, it may not be able to redirect it to a target area in Portugal. Similarly, while movable feed horn assembly 1306 may be movable to redirect a corresponding spot beam from a target area in Denmark to a target area in Portugal, it may not be possible to redirect it to a target area in Maine. Positions and ranges of movement of each movable feed horn assembly may be customized according to the geographic region within which it is desirable to be able to redirect a corresponding spot beam. Ranges of movement may be increased, for example, by using longer arms for some movable feed horn assemblies. In some cases, where a simple range of motion (e.g., along a line) is adequate, a simpler linkage may be used (e.g., a four bar linkage). In some cases, movable feed horn assemblies may provide overlapping ranges for respective feed horns. This may provide some redundancy (e.g., if a feed horn fails, a neighboring feed horn may be relocated to the position of the failed feed horn to replace it).

Figure 13D:
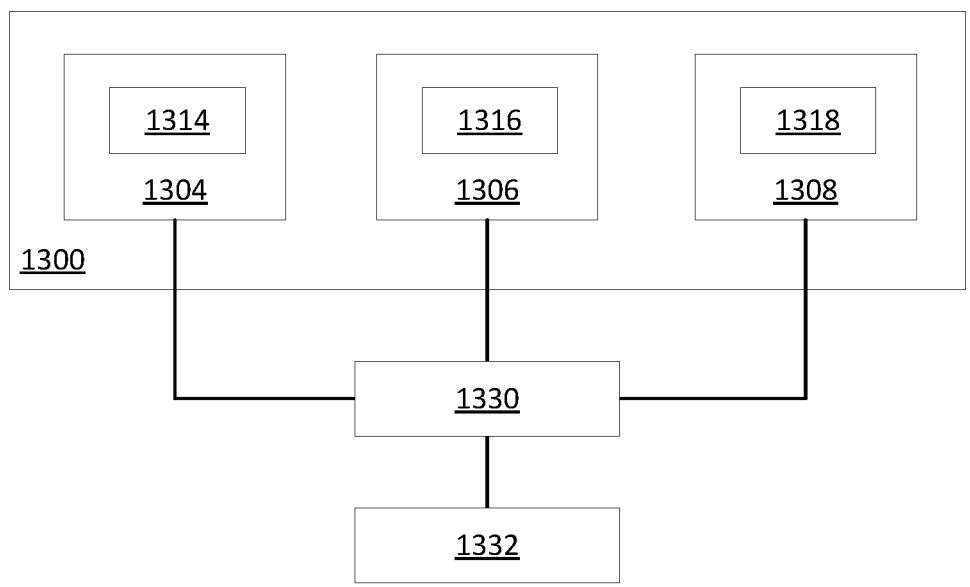

FIG. 13D is a schematic illustration that includes movable feed horn assemblies 1304, 1306, 1308 of feed assembly 1300 and control circuit 1330, which is connected to movable feed horn assemblies 1304, 1306, 1308 to control movement of feed horns 1314, 1316, 1318. Control circuit 1330 is connected to communication circuit 1332, which may be in communication with a network control center (e.g., NCC 230) to enable commands from the network control center to be sent to control circuit 1330. In an example, control circuit 1330 and/or communication circuit 1332 are implemented by payload communication circuit 140 and/or TC&R communication circuit 118. For example, a command may be received to redirect one or more spot beam associated with one or more of feed horns 1314, 1316, 1318 from a first target area to a second target area. Control circuit 1330 may receive such a command from communication circuit 1332 and may determine which of feed horns 1314, 1316, 1318 should be moved and how it should be moved. For example, control circuit 1330 may convert a movement indicated by a command into numbers of steps for first and second motors of a specified movable feed horn assembly to rotate in order to redirect a corresponding spot beam as indicated. Thus, control circuit 1330 may translate instructions to redirect a spot beam into a specified number of steps for stepper motors and may send corresponding signals to the specified stepper motors. For example, in order to move feed horn 1314 to a new location corresponding to redirecting a corresponding spot beam, control circuit 1330 may command a first motor of movable feed horn assembly 1304 to rotate a first number of steps and command a second motor of movable feed horn assembly 1304 to rotate a second number of steps. Feed horns 1316 and 1318 (and any stationary feed horns) are not affected by such movement.

An example apparatus includes a planar five bar linkage having a ground link and an endpoint. A feed horn is attached to the endpoint of the planar five bar linkage. A first motor is attached to a first side of the ground link to move the endpoint and a second motor attached to a second side of the ground link to move the endpoint.

The first motor and the second motor may be configured to move the endpoint along a plane defined by the planar five bar linkage. The apparatus may further include a reflector and the plane defined by the planar five bar linkage may be a focal plane of the reflector. The reflector may be substantially parabolic. The apparatus may include at least another feed horn attached to an endpoint of at least another planar five bar linkage to move the at least another feed horn in the focal plane of the reflector. The reflector may be attached to a satellite body in a fixed orientation. The planar five bar linkage may include a first bar extending from the first motor, a second bar extending between the first bar and the endpoint, a third bar extending from the second motor and a fourth bar extending between the third bar and the fourth bar. The first bar may be coupled to the second bar by a first hinge, the third bar may be coupled to the fourth bar by a second hinge and the second bar may be coupled to the fourth bar by a third hinge. The first motor, the second motor, the first hinge, the second hinge and the third hinge may each have a respective axis of rotation that is perpendicular to a plane to enable movement of the endpoint along the plane. The first motor and the second motor may be stepper motors that are controlled by a controller to position the feed horn.

An example apparatus includes a hub and a plurality of movable feed horn assemblies attached to the hub. Each movable feed horn assembly includes: a feed horn; a linkage to enable movement of the feed horn along a common plane; a first motor attached to the linkage to move the feed horn along the common plane; and a second motor attached to the linkage to move the feed horn along the common plane.

The linkage may include a first arm and a second arm, the first arm attached to the first motor at a first end and attached to the second arm at a second end, the second arm attached to the second motor at a first end and attached to the first arm at a second end, the first arm having a first hinge between its first and second ends, the second arm having a second hinge between its first and second ends, the second ends of the first arm and the second arm attached by a third hinge. The feed horn may be attached at or near the third hinge. The apparatus may include a reflector configured to reflect RF signals between each feed horn and a respective target area. The apparatus may include a controller that is connected to the first motor and the second motor to control a location of a respective feed horn. The controller may be configured to move the respective feed horn from a first location corresponding to a first target area to a second location corresponding to a second target area. The apparatus may include one or more stationary feed horns attached to the hub by a fixed attachment.

An example of a satellite includes: a satellite body; an antenna reflector attached to the satellite body; and a feed assembly attached to the satellite body. The feed assembly includes: a hub; one or more movable feed horn assemblies attached to the hub. Each movable feed horn assembly includes: a feed horn; a planar five bar linkage to enable movement of the feed horn with respect to the hub along a common plane; a first motor attached to the planar five bar linkage to move the feed horn along the common plane; and a second motor attached to the planar five bar linkage to move the feed horn along the common plane.

The one or more movable feed horn assemblies may include at least three movable feed horn assemblies each associated with a respective spot beam. The antenna reflector may be rigidly attached to the satellite body such that the respective spot beams are steerable only by movement of corresponding feed horns.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
    a planar five bar linkage having a ground link, a first bar, a second bar, a third bar, a fourth bar and an endpoint;
    a feed horn attached to the endpoint of the planar five bar linkage;
    a first motor attached to a first side of the ground link to move the endpoint, the first bar extending from the first motor, the second bar extending between the first bar and the endpoint, the first bar coupled to the second bar by a first hinge; and
    a second motor attached to a second side of the ground link to move the endpoint, the third bar extending from the second motor, the fourth bar extending between the third bar and the endpoint, the third bar coupled to the fourth bar by a second hinge and the second bar coupled to the fourth bar by a third hinge.

2. The apparatus of claim 1, wherein the first motor and the second motor are configured to move the endpoint along a plane defined by the planar five bar linkage.

3. The apparatus of claim 2, wherein the apparatus further comprises a reflector and the plane defined by the planar five bar linkage is a focal plane of the reflector or is a plane parallel to the focal plane.

4. The apparatus of claim 3, wherein the reflector is substantially parabolic.

5. The apparatus of claim 3, further comprising at least a second planar five bar linkage comprising a second endpoint, at least one floating link, and a second feed horn attached to the second endpoint or the floating link, wherein the second planar five bar linkage is configured to move the at least another feed horn in the focal plane of the reflector or in a plane parallel to the focal plane of the reflector.

6. The apparatus of claim 3, wherein the reflector is attached to a satellite body in a fixed orientation.

7. The apparatus of claim 1, wherein the first motor, the second motor, the first hinge, the second hinge and the third hinge each has a respective axis of rotation that is perpendicular to a plane to enable movement of the endpoint along the plane.

8. The apparatus of claim 1, wherein the first motor and the second motor are rotary motors that are controlled by a controller to position the feed horn.

9. An apparatus comprising:
    a hub; and
    a plurality of movable feed horn assemblies attached to the hub, each movable feed horn assembly including:
    a feed horn;
    a planar five bar linkage to enable movement of the feed horn along a common plane, the planar five bar linkage including a ground link, a first bar, a second bar, a third bar, a fourth bar and an endpoint, the feed horn attached to the endpoint;
    a first motor attached to the planar five bar linkage to move the feed horn along the common plane, the first bar extending from the first motor, the second bar extending between the first bar and the endpoint, the first bar coupled to the second bar by a first hinge; and a second motor attached to the planar five bar linkage to move the feed horn along the common plane, the third bar extending from the second motor, the fourth bar extending between the third bar and the endpoint, the third bar coupled to the fourth bar by a second hinge and the second bar coupled to the fourth bar by a third hinge.

10. The apparatus of claim 9, wherein the feed horn is attached to a floating link at the third hinge.

11. The apparatus of claim 9, further comprising a reflector configured to reflect RF signals between each feed horn and a respective target area.

12. The apparatus of claim 9, further comprising a controller that is connected to the first motor and the second motor to control a location of a respective feed horn.

13. The apparatus of claim 12, wherein the controller is configured to move the respective feed horn from a first location corresponding to a first target area to a second location corresponding to a second target area.

14. The apparatus of claim 9, further comprising one or more stationary feed horns attached to the hub by a fixed attachment.

15. A satellite comprising:
a satellite body;
an antenna reflector attached to the satellite body; and
a feed assembly attached to the satellite body, the feed assembly including:
a hub;
one or more movable feed horn assemblies attached to the hub, each movable feed horn assembly including:
a feed horn;
a planar five bar linkage to enable movement of the feed horn with respect to the hub along a common plane, the planar five bar linkage including a ground link, a first bar, a second bar, a third bar, a fourth bar and an endpoint, the feed horn attached to the endpoint;
a first actuator attached to the planar five bar linkage to move the feed horn along the common plane, the first bar extending from the first actuator, the second bar extending between the first bar and the endpoint, the first bar coupled to the second bar by a first hinge; and
a second actuator attached to the planar five bar linkage to move the feed horn along the common plane, the third bar extending from the second actuator, the fourth bar extending between the third bar and the endpoint, the third bar coupled to the fourth bar by a second hinge and the second bar coupled to the fourth bar by a third hinge.

16. The satellite of claim 15, wherein the one or more movable feed horn assemblies includes at least two movable feed horn assemblies each associated with a respective spot beam.

17. The satellite of claim 16, wherein the antenna reflector is rigidly attached to the satellite body or mechanically steerable relative to the satellite body such that the respective spot beams are independently steerable by movement of corresponding feed horns.

\* \* \* \* \*